(12) United States Patent
De Hullu et al.

(10) Patent No.: US 10,694,713 B2
(45) Date of Patent: Jun. 30, 2020

(54) MILKING DEVICE

(71) Applicant: Lely Patent N.V., Maassluis (NL)

(72) Inventors: Mattheus Jacob De Hullu, Maassluis (NL); Dirk Dijkshoorn, Maassluis (NL); Ruben Alexander Van Tilburg, Maassluis (NL)

(73) Assignee: Lely Patent N.V., Maassluis (NL)

( * ) Notice: Subject to any disclaimer, the term of this patent is extended or adjusted under 35 U.S.C. 154(b) by 563 days.

(21) Appl. No.: 15/305,700

(22) PCT Filed: May 4, 2015

(86) PCT No.: PCT/NL2015/050308
§ 371 (c)(1),
(2) Date: Oct. 21, 2016

(87) PCT Pub. No.: WO2015/170975
PCT Pub. Date: Nov. 12, 2015

(65) Prior Publication Data
US 2017/0042108 A1 Feb. 16, 2017

(30) Foreign Application Priority Data

May 9, 2014 (NL) ...................................... 2012792

(51) Int. Cl.
*A01J 5/007* (2006.01)
*A01J 5/04* (2006.01)
*A01J 7/02* (2006.01)

(52) U.S. Cl.
CPC ............... *A01J 5/007* (2013.01); *A01J 5/044* (2013.01); *A01J 7/022* (2013.01)

(58) Field of Classification Search
CPC ............. A01J 5/007; A01J 5/044; A01J 7/022
See application file for complete search history.

(56) References Cited

U.S. PATENT DOCUMENTS 4,064,838 A * 12/1977 Mukarovsky ......... A01J 5/0133
119/14.08
5,275,124 A 1/1994 Van Der Lely et al.
(Continued)

FOREIGN PATENT DOCUMENTS

EP 0 679 331 A2 11/1995
WO 2010/036102 A2 4/2010

OTHER PUBLICATIONS

International Search Report and Written Opinion dated Sep. 16, 2015 in PCT/NL2015/050308 filed May 4, 2015.

*Primary Examiner* — Monica L Williams
(74) *Attorney, Agent, or Firm* — Oblon, McClelland, Maier & Neustadt, L.L.P.

(57) ABSTRACT

A milking system including: at least one milking device; a milk storage vessel storing milk obtained with the milking device; a milk line system with a milk line with a first end connected to the milking device and with a second end connected to the milk storage vessel; and a monitoring system including: a sensor configured to measure a fluid parameter value of a fluid in the milk line, and a control system actively connected to the sensor and configured to process the measured fluid parameter value and generate a transition signal on fulfilment of a predefined transition criterion. The milk line includes a substantially vertical line portion, and a proposed discharge direction of milk runs through the milk line from the milking device to the milk storage vessel and is raised through the line portion, wherein the sensor is placed in or on the substantially vertical line portion.

17 Claims, 2 Drawing Sheets

(56) References Cited

U.S. PATENT DOCUMENTS

Figure 1:
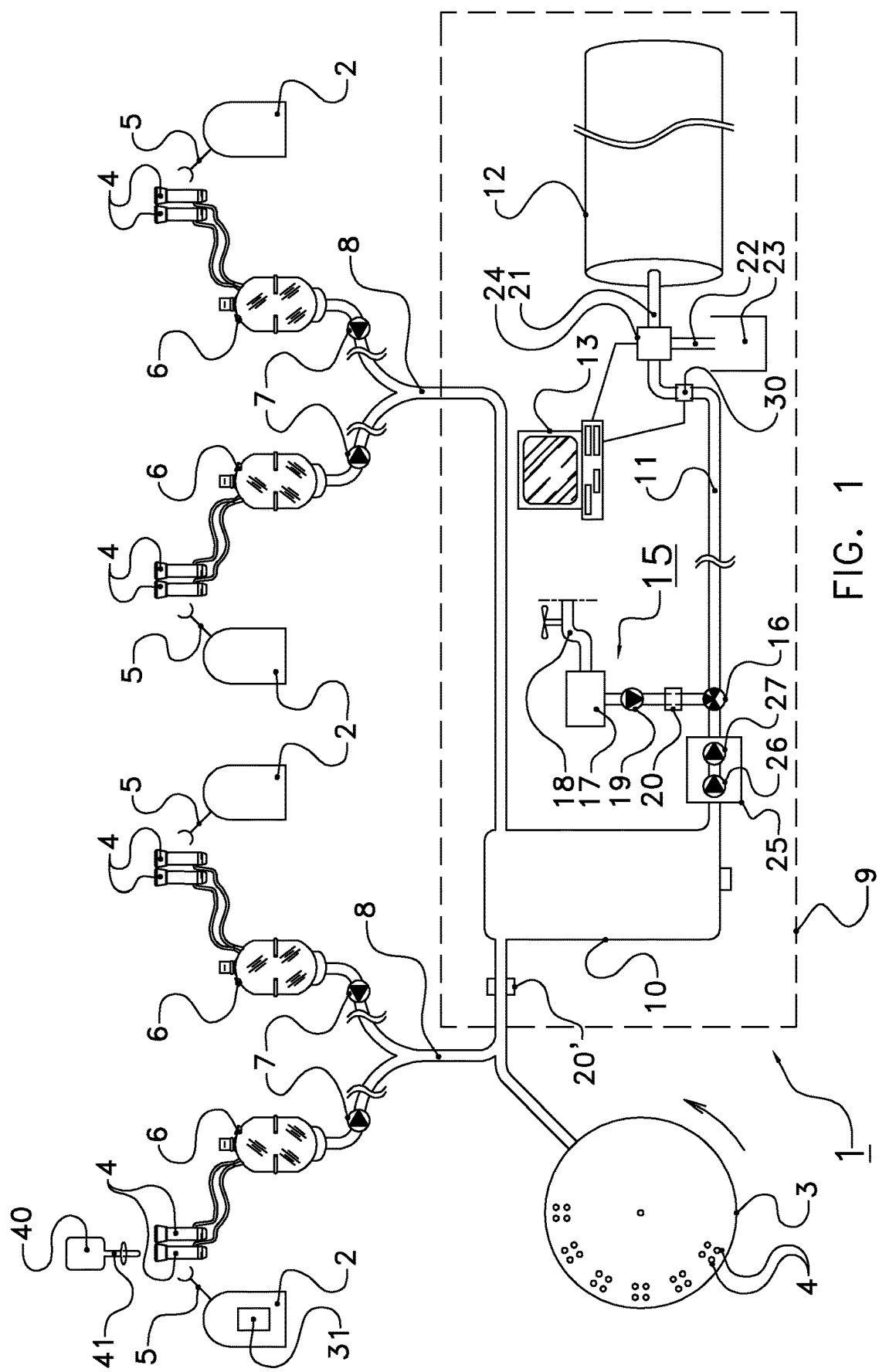

| | | | |
|---|---|---|---|
| 5,651,329 A | 7/1997 | Van Den Berg et al. | |
| 5,881,669 A | 3/1999 | Van Den Berg et al. | |
| 6,401,654 B1 * | 6/2002 | Hallsten | A01J 7/025 |
| | | | 119/14.18 |
| 7,198,003 B2 * | 4/2007 | Bosma | A01J 5/0175 |
| | | | 119/14.18 |
| 7,448,344 B2 * | 11/2008 | Bosma | A01J 5/044 |
| | | | 119/14.08 |
| 8,646,411 B2 * | 2/2014 | Wartenhorst | A01J 5/048 |
| | | | 119/14.02 |
| 2011/0168097 A1 | 7/2011 | Kristensen et al. | |

* cited by examiner

MILKING DEVICE

The present invention relates to a milking system comprising at least one milking device, a milk storage vessel for storing milk obtained with the milking device, and a milk line system with a milk line with a first end connected to the milking device and with a second end connected to the milk storage vessel.

Such milking systems are known. The milk obtained is pumped to a storage tank where the milk can be stored cold until it is collected by a milk tanker. The milking system must be cleaned regularly. For this, usually cleaning fluid, either hot or cold water, water with a cleaning agent or a combination thereof, is conducted through the at least one milking device and at least the milk line system.

One problem with the known milking system is that it cannot always be reliably guaranteed that no cleaning fluid will enter the milk storage vessel. This is highly undesirable in relation to milk quality.

It is an object of the present invention to offer a solution to this problem, to improve the known milking systems such that a more reliable control takes place in the milking system.

The invention achieves this object with a milking system according to claim 1, in particular with a milking system comprising at least one milking device, a milk storage vessel for storing milk obtained with the milking device, a milk line system with a milk line with a first end connected to the milking device and with a second end connected to the milk storage vessel, and a monitoring system which comprises a sensor configured for measuring a fluid parameter value of a fluid in the milk line, and a control system operatively connected to the sensor and configured for processing the measured fluid parameter value and for generating a transition signal on fulfilment of a predefined transition criterion, wherein the milk line comprises a substantially vertical line portion, wherein in particular a proposed discharge direction of milk runs through the milk line from the milking device to the milk storage vessel and is upwards through said line portion, wherein the sensor is placed in or on the substantially vertical line portion.

The monitoring system is configured for monitoring a fluid transition in a passing fluid, namely between passing milk and passing cleaning fluid, and vice versa. By monitoring a (suitable) fluid parameter value, a transition between two fluids can be established. This will be explained in more detail below.

The concept behind the invention is that a monitoring system is created which can detect a fluid transition without a (high) load of air bubbles in the fluid. Largely because of the milking process used, milk is a two-phase fluid, with milk as a liquid and air bubbles as the second phase. It will be clear that the properties of milk firstly and air bubbles secondly differ substantially. By placing the sensor in a substantially vertical line portion, any air bubbles will not flow slowly past this and hence disrupt a measurement for a considerable time, but shoot past at high speed. Hence the relative proportion in a measurement signal from the sensor caused by these air bubbles will diminish. The reliability of a measurement and hence of detection of a fluid transition will thus increase. Moreover, this applies not only to air bubbles but also to a gas layer of greater or lesser extent above the milk or other fluid, in the case where the line is not completely filled. In this case, the quantity of gas—probably also in the form of a number of bubbles—will pass rapidly by and not disrupt the measurement or only to a lesser extent.

It is easier to exclude brief rapid peaks in the measurement because such outlying values are indicated as noise earlier. For example by use of a suitable filter on the measurement values, such as a Kalman filter, outlying values from gas bubbles are eliminated and the sensor measurement becomes more reliable.

In the context of the present invention, a (substantially) vertical line portion means that the line portion at the site of the sensor makes an angle of maximum 30° with the vertical, and in particular maximum 15°. At such an angle, gas bubbles can shoot past with sufficient speed. It is furthermore pointed out that the line portion need not be designed straight but may also be slightly curved, as long as it is substantially vertical at the site of the sensor and does not have a true bend of e.g. 90°. In addition, the line portion need not be a separate part of the milk line but may also be a section in a unitary milk line.

The proposed discharge direction is naturally the direction in which the milk will flow if transferred via the milk line to the milk storage vessel, and at the site of the sensor it will flow up through the line portion. Note that if the proposed discharge direction at the site of the sensor were downward, air bubbles would be slowed down by the downwardly flowing fluid.

It is also noted that the advantages of the present invention are particularly applicable if at least one milking device is a robot milking device. In particular, robot milking devices are suitable for voluntary animal traffic, wherein the dairy animals choose their own milking times, whereby the milk flow may be irregular. In contrast, milking systems with fixed milking events which normally use manned, partly manual milking devices, often have a more regular milk flow with more peaks, wherein fewer gas bubbles occur in the milk.

Particular embodiments of the invention are described in the dependent claims and in the description below.

In particular, the substantially vertical line portion transforms with a bend into a substantially horizontal line portion lying upstream thereof in the proposed discharge direction, wherein the sensor lies higher by a predefined height H than a transition from the substantially horizontal line portion to the bend portion. In these embodiments, it is firstly guaranteed that the sensor lies in a vertical line portion and secondly that the total height of the milk line may remain limited. Here the (substantially) horizontal line portion includes not only the purely horizontal but also angles within 10° of the horizontal. In particular, downward slopes, i.e. an angle of maximum 10° below the horizontal viewed in the proposed discharge direction, are common and often even prescribed for milk lines. It is also noted that the transition means in particular a curved line portion, and more particularly the inner bend of this curvature.

In certain embodiments, H is at least 25 cm. In these embodiments, it is reliably guaranteed that the air bubbles can accelerate sufficiently to shoot rapidly past the sensor. However, if the sensor is located immediately after a (short) bend, it is possible that the air bubbles will still only move slowly upward. By maintaining a distance of at least 25 cm, in most cases the speed will increase sufficiently. Also with such an embodiment, less turbulence will occur at the sensor, which also improves the reliability of the measurement. It is however noted that other minimum heights are also possible. This may depend for example on a line diameter at the site of the sensor. Larger line diameters may give rise to a smaller minimum predefined height H than smaller line diameters.

In certain embodiments, the substantially vertical line portion runs at least to a height Y above the sensor, wherein Y is at least 10 cm, and preferably at least 25 cm. In these embodiments, it is reliably guaranteed that no accumulation of air bubbles will occur above the sensor, which could disrupt the measurement. The air bubbles can travel past the sensor. In addition, it is advantageous to arrange the sensor at such a part of the line that the fluid flow is as regular as possible. It is less advantageous if a sensor is placed in or close to a bend. Placing the sensor in a line portion which is substantially straight between at least 25 cm below the sensor and at least 10 cm above the sensor, guarantees a more reliable measurement.

In certain embodiments, the sensor is selected from the group comprising a conductivity meter, an optical meter, a thermometer and an HF capacitance spectrum profiling meter. The fluid parameter value is advantageously selected from the conductivity of the fluid, an optical parameter of the fluid, namely the transmission, scatter, reflection, color or combination thereof, and an HF capacitance spectrum profile, wherein a spectral capacitance profile of the fluid in the high frequency range is created. In these embodiments, the sensor is configured for measuring one or more of such parameters. Nonetheless, other fluid parameters are not excluded. The selected parameters are however tested and proven in practice for their value. Conductivity in particular is often used to determine a quality of the milk, wherein a great deal is known concerning the conductivity values which occur in milk. Note that conductivity is itself temperature-dependent, so that a thermometer can also serve to correct or calculate conductivity back to a standard temperature. In addition, the difference in conductivity between firstly types of milk and secondly cleaning fluid in the form of hot or cold water, or water with an additive such as a sanitizer or cleaning agent, is considerable. In particular, the latter has a much lower conductivity or a much higher conductivity than milk, so that rapid and reliable measurement is possible.

In certain embodiments, the predefined transition criterion comprises that at least one of the measured parameter value, a change of the measured parameter value, or a time-derivative change in the measured parameter value falls outside a first predefined range. For example in these embodiments, the measured parameter value itself is considered, such as conductivity or color of the fluid. If this changes or moves outside a defined range, this may indicate a fluid transition. Also, the extent to which the fluid parameter value changes may be considered. For example, the conductivity of milk may change in the course of a milking or because the milk is for example not optimally mixed. Nonetheless, the conductivity should lie at a specific value and therefore a fluid transition can only be concluded from a change which falls outside a predefined range. As an alternative, a fluid transition may be determined from a rate of change of the measured parameter values. Looking at the temperature of the fluid for example, a fluid transition will be likely if the temperature falls for example by 10° per second. The temperature of milk may vary to some extent, and even for example fall to a greater or lesser extent due to cooling in a long milk line, but the cleaning fluid will usually have a different temperature from the milk. One example of a cleaning fluid is for example pipe water which usually has a temperature between 10 and 20°, while milk has a temperature between 30 and 35°. A rapid transition may indicate a fluid transition, while a slow transition for example may also indicate a weather change without a fluid change. It is also pointed out that the predefined range may run from a first to a second value, but also for example may be a range without upper limit, such as a conductivity above x Siemens. In addition, to filter out undesirable and insignificant noise peaks, measurement is carried out during a defined minimum period and in some cases averaged over the period.

In certain embodiments, the milk line between the sensor and the second end also comprises a valve device with a plurality of states which is controllable by the control system, wherein the control device is configured to control the state of the valve device on the basis of the transition signal generated. In these embodiments, the control system is thus configured to control the valve device on the basis of the measured parameter value or the generated transition signal, and in particular to prevent a fluid other than milk from entering the milk storage vessel. For this, the valve device may for example comprise a single valve which may be closed so that the fluid can no longer flow to the original destination but for example can be extracted again or drained. The valve device may also comprise a plurality of valves and/or a multiway valve which is closed to undesirable directions and open to desirable directions, in each case when a transition signal is received by the control system.

In certain embodiments, the milk line system at the valve device also comprises a fluid discharge, and wherein in a first state of the valve device the milk line is in fluidic connection with the milk storage vessel, and in a second state of the valve device the milk line is in fluidic connection with the fluid discharge, in particular a drain. In these embodiments, a fluid not being milk is in particular directed to a drain. This is advantageous in particular if the other fluid is for example a cleaning fluid. It is pointed out here that in all embodiments cited in this application, the invention offers particular advantages if milk is pumped further using water or another fluid. In this case it is particularly important to be able to detect a fluid transition and in this way prevent the cleaning fluid from entering the milk storage vessel. In addition, the further propulsion of milk with a fluid which is not compressible has advantages in relation to the mechanical load on the milk. With the low speed required, in particular fat lumps will remain whole more often, whereby the content of free fatty acids in the milk will rise to a lesser extent than when milk is propelled with compressed air. Nonetheless, the present invention also offers advantages in the case where the milk is propelled by compressed air, as then the reliability and safety of such a milking system is also increased. However another fluid may still accidentally enter the milking system, wherein now a fluid transition can always be detected and specific measures taken.

In certain embodiments, the milking system furthermore comprises a fluid supply, not being a milk supply, to at least the milk line system, which is controllable by the control system and is located upstream of the sensor viewed in the proposed discharge direction of the milk. In these embodiments, there is at least one fluid supply to the milk line system and then also one or more milking devices via which fluids other than milk can be supplied. This applies in particular to cleaning fluid such as water.

In certain embodiments, the milking system furthermore comprises a pump for pumping the fluid present in the milk line system in the proposed discharge direction. In these embodiments, a pump is used to pump the fluid, although in theory gravity could also be used.

In certain embodiments, the control system is configured to determine a quantity value of fluid supplied via the fluid supply, and to process exclusively fluid parameter values which are measured by the sensor after the pump has pumped a quantity of fluid which is at least as great as a predefined part of one of the defined quantity value and a volume of the milk line between the fluid supply and the sensor. These embodiments are advantageous because only measurement values are considered which were measured when a fluid transition could have occurred. Fluids are not compressible and it may be sufficient to keep a record of where the fluid transitions occur in the milk line. For example, starting from a milk line completely filled with fluid, water is supplied through the fluid supply. If a quantity of water is supplied which is greater than the volume of the milk line between the milk line supply and the sensor, a fluid transition should certainly be measured when the quantity of fluid supplied is approximately equal to said volume. For safety's sake, measurement begins when a predefined proportion thereof is supplied, such as for example 90%. In addition, this applies if this fluid transition from milk to another fluid has been detected, and a following fluid transition is to be detected on further pumping of a quantity of fluid which is equal to said quantity value. A following fluid, namely milk, must then be able to be detected. Also for safety's sake, measurement begins here on pumping of a predefined proportion of said quantity value.

In certain embodiments, an intermediate milk storage vessel is arranged in the milk line, which intermediate milk storage vessel is connected between the at least one milking device and the milk storage vessel, and configured for temporary storage of milk from each of the connected milking devices and subsequent transfer of the milk to the milk storage vessel. Such an intermediate milk storage vessel is advantageous if the distance between the milking device(s) and the milk storage vessel is great, whereby a high line resistance will occur and any pump arranged in the milking device will only be able to pump the milk with difficulty and hence with a considerable mechanical load. By installing an intermediate milk storage vessel, the milk pump of the milking device need only pump the milk to an intermediate milk storage vessel, which can often be placed close by. With an intermediate milk storage vessel, a special pump may be provided which can pump milk with a much greater capacity to the milk storage vessel through a milk line, which may now also be much thicker. An intermediate milk storage vessel or buffer vessel may also be more advantageous in the case of a plurality of milking devices. Also an intermediate milk storage vessel is advantageous if the milking devices are robot milking devices in systems with free animal traffic, wherein the milk flow may be irregular; these differences in the milk flow can then be better absorbed by buffering the milk in the intermediate milk storage vessel. In such embodiments, it may be advantageous to arrange a monitoring device in each of the sub-milk lines between the one or more milking devices and the intermediate milk storage vessel, as each of the milking devices can direct a different fluid to the milk storage vessel, which is undesirable if milk is still present in the intermediate milk storage vessel. However, it may be sufficient to arrange the monitoring device exclusively close to the milk storage vessel, for example if the milking devices are already fitted with one or more milking devices for monitoring the properties of the fluid which is directed to the intermediate milk storage vessel. The latter will usually be the case if many milking devices are provided with a conductivity meter for the milk. The single monitoring device provided in that case will then fulfil the aim already described above of detecting a transition between milk and cleaning fluid in the (main) line.

Figure 2:
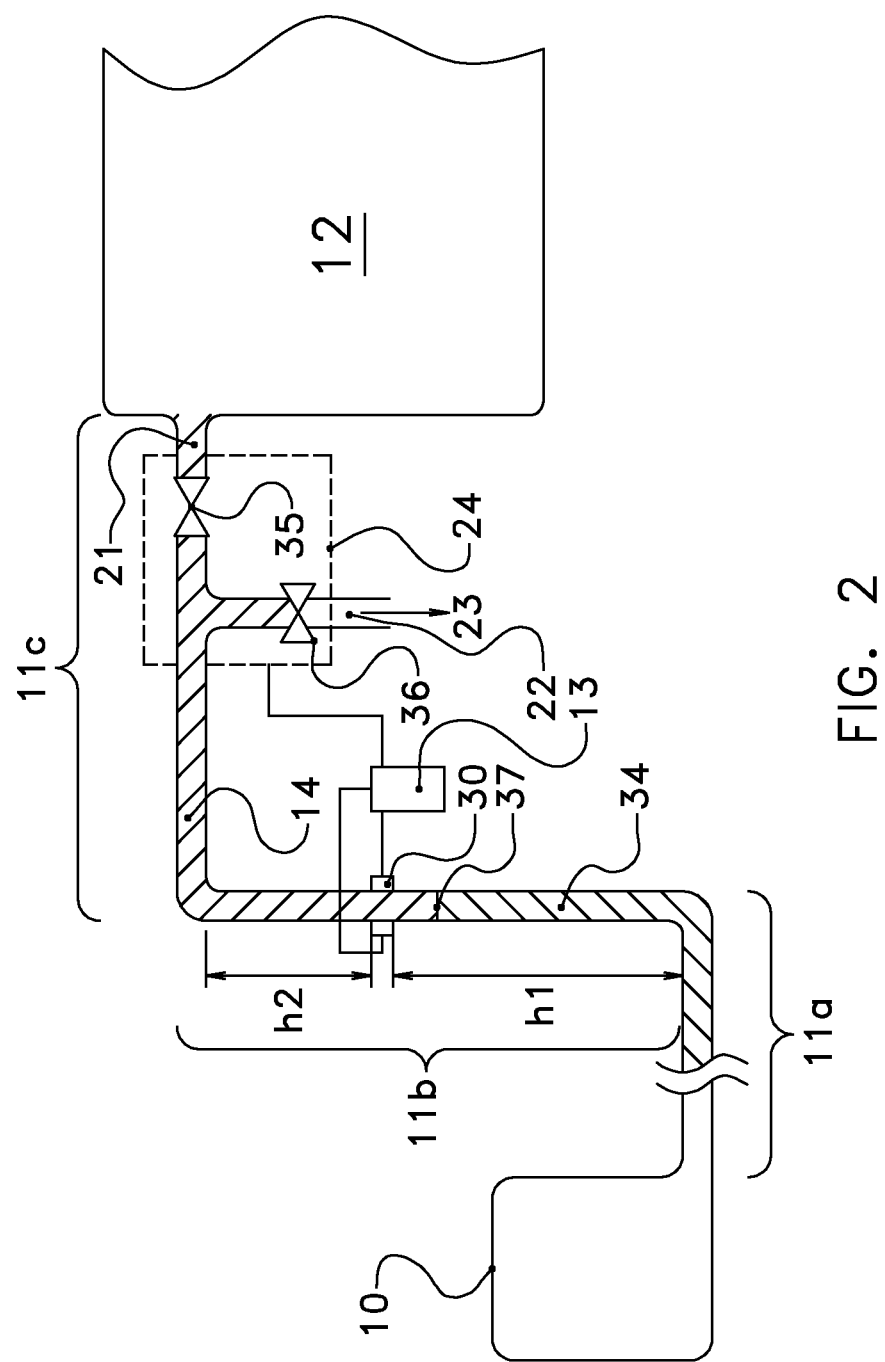

The invention will now be explained in more detail with reference to the drawing which shows a non-restrictive exemplary embodiment, and wherein:

FIG. 1 depicts in a highly diagrammatic view a milking system 1 according to the invention, FIG. 2 depicts highly diagrammatically a side view of a detail of a milking system according to the invention, and partially in cross-section.

FIG. 1 depicts a milking system 1 according to the invention in a highly diagrammatic view. The milking system 1 here comprises four milking robot devices 2 and a carousel 3. Each milking robot device 2 has milking cups 4 and a gripper arm 5 for placing the milking cups on the teats of a dairy animal. In addition, a milk glass 6 is also provided for capturing the milk from a milking, and a milking pump 7 for pumping the milk through the milk line 8 to a milk storage system 9, comprising an intermediate milk storage vessel 10 which is connected via a main milk line 11 to a milk tank 12.

13 designates a control system, and 15 a cleaning fluid supply which is connected via a second selection device 16 to the main milk line 11, and comprises a boiler 17, a water pipe supply 18, a pump 19 and a flow meter 20.

20' also indicates a flow meter. In addition, 21 designates a first discharge and 22 a second discharge to an outlet capture unit 23, and a selection device 24.

25 indicates a pump system with a first pump 26 and a second pump 27. 30 indicates a sensor. Reference numeral 40 indicates a cleaning device with a cleaning fluid supply 41.

The milking system 1 shown here comprises a carousel 3 with a plurality of milking stands with milking cups 4, and also four milking robot devices 2. It is clear that the milking system may also comprise merely one carousel or a plurality of carousels, and also merely any number of milking robot devices such as two, eight, sixteen etc.

Also, not all details relevant to the invention are shown, such as milking stands at the milking robot devices etc. Also the cleaning device 40 is shown for just one milking robot device 2. It will be clear that this is arranged at or in front of each of the milking robot devices 2, although not necessarily separately in each case. A corresponding cleaning device may be placed on the carousel 3.

Each milking robot device 2 is configured for milking a dairy animal at a milking stand (not shown). For this, using the gripper arm 5 or another suitable device, the milking robot device 2 places the milking cups 4 on the teats of the dairy animal. Here only two milking cups 4 are shown, which is sufficient for a goat or similar. For cows, four milking cups are required. The milk obtained with the milking cups 4 is captured per milking in the milk glass 6. The milking robot device 2 is furthermore configured to determine whether the milk from the milking, as consumption milk, should be transferred from the milk glass 6 to the milk tank 12. For this, the milking robot device 2 has apparatus not shown here, such as a milk quality device or a management system which, for example on the basis of an established animal identity, can determine whether the milk is suitable or unsuitable for human consumption. If the milk is found to be unsuitable, a discharge (not shown here) of the milk is created from the milk glass 6 e.g. to a drain or to a residual milk capture unit. If the milk is found suitable for human consumption, it is pumped by the milk pump 7 from the milk glass 6 into the milk line system 8. The milk is then captured in the milk storage system 9, which here comprises an intermediate milk storage vessel 10.

The intermediate milk storage vessel 10 receives milk from several milkings, and for example—as shown here—milk from a plurality of milk glasses and/or from a carousel 3. The volume of the intermediate milk storage vessel 10 is then selected accordingly, and for example comprises a few hundred liters.

When the intermediate milk storage vessel 10 is sufficiently full, the milk is pumped out by the pump system 25 through the main milk line 11 to the milk tank 12. This is controlled by the control system 13, which is here depicted only highly diagrammatically. The same applies to the connections depicted between the control system 13 and the various components of the milking system 1 controlled by the control system 13, which connections are here only shown in part and highly diagrammatically. It is self-evident that an active connection is present between the control system 13 and the controlled components of the milking system 1, which connection may be hard-wired or wireless.

Each milking device is cleaned after one or milk milkings. The description below relates to a cleaning of the milking robot device 2 which is shown at the top left in the figure. Preferably, all milking devices, such as the milk robot devices 2 and the carousel 3, are cleaned in one cleaning action, either in parallel or sequentially or in combination. If at least a second milk line system is provided, it is also possible to clean some of the milking devices and at the same time continue milking with the remaining milking devices. These details however lie outside the scope of the invention and are not discussed here.

On cleaning of the milking robot device 2, cleaning fluid is conducted through the milk-carrying part using the cleaning device 40. The milk-carrying part of the milk robot device 2 comprises at least the milking cups 4, the milk glass 6, the milk pump 7 and the part of the milk line system 8 between the milk pump 7 and the intermediate milk storage vessel 10. For cleaning, the cleaning fluid is supplied to the milking cups 4 via the supply 41. The cleaning fluid is supplied via the cleaning fluid supply 41, for example a storage vessel such as a boiler or water pipe connection. At the start of the cleaning, the cleaning fluid which is for example heated is brought to the milking cups 4 by the supply 41. From there, the cleaning fluid, with or without the help of supplementary pump action of the milking pump 7, is pumped through the milk line system 8 to the intermediate milk storage vessel 10. In the intermediate milk storage vessel 10, the cleaning fluid from all cleaned milking devices is captured and from there pumped further in the direction of the milk tank 12. This is achieved for example using the pump system 25 which, using one or both pumps 26, 27, conducts the captured cleaning fluid through the main milk line 11. Using the selection device 24, the cleaning fluid may then be discharged for example to a discharge fluid capture unit 23 or for example to a drain. For this, the control system 13 switches a valve or valve system in the selection device 24 and creates the connection to the second discharge. Usually, i.e. when pumping milk, this selection device 24 is in a different state and a fluidic connection is created between the main milk line 11 and the first discharge 21 to the milk tank 12.

Note that the cleaning device 40 may supply, instead of heated cleaning fluid, also unheated cleaning fluid or cleaning fluid with an additive such as a cleaning agent or disinfectant. In the present case however, heated fluid is assumed. With such hot cleaning, it is desirable to fulfil a certain cleaning criterion, such as namely exceeding a defined minimum temperature for a minimum uninterrupted time.

When the cleaning fluid moves through the main milk line 11, it will cool slowly but surely and hence have the lowest temperature close to the second discharge 22. Therefore the sensor 30 is arranged close to the second discharge 22 and monitors a quality of the cleaning fluid. In this case, the sensor 30 is for example a thermometer which measures the temperature of the fluid or of the main milk line 11 itself. If the desired minimum temperature is not measured by the sensor 30, or not for a minimum uninterrupted time period, adequate cleaning, in particular of the last part of the main milk line 11, cannot be guaranteed. In such a case, hot cleaning may be supported by the supply of additional heated cleaning fluid by means of the supplementary cleaning fluid supply 15.

The supplementary cleaning fluid supply 15 comprises a boiler 17 which is fed from a water pipe 18 or another cleaning fluid supply. Using the pump 19, fluid may be supplied to the main milk line 11 via the second selection device 16. By supplying a sufficiently large quantity and/or sufficiently heated supplementary cleaning fluid, adequate cleaning, in particular of the main milk line 11, can still be guaranteed.

It is also pointed out that the pump system 25 here comprises a first pump 26 and a second pump 27. The pump system 25 may thus for example pump at several pump speeds, such as at a first pump speed set by the first pump 26 for pumping the milk, and at a second higher pump speed for pumping cleaning fluid using the second pump 27 or both pumps 26 and 27. This can also be achieved with a single controlled pump.

It will be clear that the pump system 25 cannot pump milk from the intermediate milk storage vessel 10 further than the pump system 25 itself. To move the milk further, gravity may be used, by laying the main milk line 11 with a downward slope and creating an air inlet so that no vacuum is created above the fluid or milk. The milk may however also be pumped further by the supply of cleaning fluid, after evacuation of the intermediate milk storage vessel 10. For example, as described, this fluid is supplied by the cleaning device 40 or via the supplementary cleaning fluid supply 15. Because the cleaning fluid or supplementary cleaning fluid is not compressible, it will propel the milk further in the main milk line 11. In such a state, the selection device 24 is then switched by the control device 13 such that the main milk line 11 and the first discharge 21 to the milk tank 12 are in fluidic connection, and the second discharge 22 to the fluid capture unit 23, such as a drain, is closed. The interface or boundary between the fluid and the milk in the main milk line 11 will move towards the selection device 24. When this interface reaches the sensor 30, the latter will measure a change in a parameter value such as a change in conductivity, temperature, (optical) transmission or color. The sensor 30 may emit a suitable signal to the control unit 13, which can then switch the selection device 24 so that the fluidic connection to the first discharge is closed and that to the second discharge is opened, so that thereafter the (supplementary) cleaning fluid can flow to the fluid capture unit or drain. Conversely, if thereafter the (supplementary) cleaning fluid is not drained but remains in the main milk line 11, and then milk is pumped from the intermediate milk storage vessel 10 to the milk tank 12, the interface may also be detected by the sensor 30 so that the control unit can switch the selection device 24 back accordingly in order to restore the fluidic connection to the milk tank 12 and interrupt that to the second discharge 22. Milk can thus be captured in the milk tank 12 and in each case the (supplementary) cleaning fluid is captured in the capture unit 23.

FIG. 2 depicts highly diagrammatically a side view of a detail of a milking system according to the invention, and partially in cross-section. Similar components are indicated with the same reference numerals. The milk line 11 here comprises a first, a second and a third milk line portion, designated respectively 11a, 11b, 11c. The selection device 24 comprises a milk valve 35 to the first discharge 21 and a cleaning fluid valve 36 to the second discharge 22. 37 indicates an interface between the cleaning fluid 34 and milk 14.

In the use of the system, milk 14 is pumped from the intermediate milk storage vessel 10 in the direction of the milk tank 12. The milk 14 can then be pumped further through the main milk line 11 by the supply of cleaning fluid 34. The interface 37, which in practice will become a boundary region due to some mixing, will then also move in the direction of the milk tank 12. For monitoring the interface 37, the sensor 30 is provided which for example monitors a conductivity and/or color and/or another parameter value of the fluid in the main milk line 11. When a change occurs in the value measured by the sensor 30, or a change of a minimum size, or when a threshold value is passed upwardly or downwardly, the control unit 13 may determine that the interface 37 is at the level of the sensor 30. The control unit 13 may then still operate the selection device 24 in time and for example close the milk valve 35 and open the cleaning fluid valve 36, in order to prevent cleaning fluid for 34 from entering the milk tank 12.

In practice, the measurement of the sensor 30 may be disrupted by air bubbles or similar flowing slowly or quickly past. Since a defective measurement by the sensor 30 may lead to incorrect setting of the valve 35, 36 of the selection device 24, and hence to cleaning fluid 34 entering the milk tank 12 or consumption milk 14 entering the drain 23, it is important to minimize the influence of such air bubbles. For this, the sensor 30 is placed in a substantially vertical milk line portion 11b. In this way air bubbles can shoot past quickly, and hence only influence the measurement of the sensor 30 to a limited extent or for a very short time. The sensor 30 is preferably located at a height h1 of at least 25 cm above the milk line portion 11a, so that air bubbles and similar can shoot past with sufficient speed. In addition, the milk line portion 11b preferably extends for a height h2 of at least 10 cm above the sensor 30, so that no accumulation of air bubbles occurs at the sensor 30.

The interface 37 will not be able to reach the sensor 30 before a volume of the size of the capacity of the main milk line 11 between any inflow of cleaning fluid and the sensor 30 has passed by. Said volume is at least equal to the volume between the second selection device 16 and the sensor 30. This volume, known in itself or for example obtained by measurement, may help prevent false-positive measurements. By always recording the quantity of cleaning fluid pumped into the main milk line 11, in the cleaning fluid supply 15 and in particular the flow meter 20 thereof, or alternatively in the cleaning device(s) 40 and/or the flow meter 20', measurement by the sensor 30 need only begin when the interface 37 is sufficiently close to the sensor, for example a few meters away. Advantageously, the control system 13 is also actively connected to the flow meter 20, or alternatively to a flow meter 20' which is configured to record how much cleaning fluid has flowed into the intermediate milk storage vessel 10. As a further alternative, a flow meter may be arranged immediately after the second selection device 16 and can determine the quantity of any fluid which has flowed into the main milk line 11, and transfer this to the control unit 13.

The embodiments shown are only intended as non-limitative examples. The scope of protection is determined from the enclosed claims.

The invention claimed is:

1. A milking system comprising:
   at least one milking device;
   a milk storage vessel storing milk obtained with the milking device;
   a milk line system including a milk line with a first end connected to the milking device and with a second end connected to the milk storage vessel; and
   a monitoring system which comprises:
      a sensor configured to measure a fluid parameter value of a fluid in the milk line to determine a transition between milk and a cleaning fluid, and
      a control system operatively connected to the sensor and configured to process the measured fluid parameter value and to generate a transition signal on fulfilment of a predefined transition criterion;
   wherein the milk line comprises a substantially vertical line portion, and a proposed discharge direction of milk runs through the milk line from the milking device to the milk storage vessel and is upwards through the substantially vertical line portion, and
   wherein the sensor is placed in or on the substantially vertical line portion to allow air bubbles to pass at high speed past the sensor to avoid disrupting a measurement of the fluid parameter.

2. The milking system as claimed in claim 1, wherein the substantially vertical line portion transforms with a bend into a substantially horizontal line portion lying upstream thereof in the proposed discharge direction, and wherein the sensor lies higher by a predefined height H than a transition from the largely horizontal line portion to the bend portion.

3. The milking system as claimed in claim 2, wherein H is at least 25 cm.

4. The milking system as claimed in claim 1, wherein the substantially vertical line portion runs at least to a height Y above the sensor, wherein Y is at least 10 cm.

5. The milking system as claimed in claim 1, wherein the sensor is selected from the group of a conductivity meter, an optical meter, a thermometer, and an HF capacitance spectrum profiling meter.

6. The milking system as claimed in claim 1, wherein the predefined transition criterion comprises that at least one of the measured parameter value, a change of the measured parameter value or a time-derivative change in the measured parameter value falls outside a first predefined range.

7. The milking system as claimed in claim 1, wherein the milk line between the sensor and the second end further comprises a valve device with a plurality of states and controllable by the control system,
   wherein the control system is configured to control a state of the valve device on a basis of the generated transition signal.

8. The milking system as claimed in claim 7, wherein the milk line system at the valve device further comprises a fluid discharge, and wherein in a first state of the valve device the milk line is in fluidic connection with the milk storage vessel, and in a second state of the valve device the milk line is in fluidic connection with the fluid discharge, or a drain.

9. The milking system as claimed in claim 7, further comprising a fluid supply, not being a milk supply, to at least the milk line system, which is controllable by the control system and is located upstream of the sensor viewed in the proposed discharge direction of the milk.

10. The milking system as claimed in claim 9, wherein the control system is configured to determine a quantity value of fluid supplied via the fluid supply, and to process exclusively fluid parameter values which are measured by the sensor after the pump has pumped a quantity of fluid which is at least as great as a predefined part of one of the defined quantity value and a volume of the milk line between the fluid supply and the sensor.

11. The milking system as claimed in claim 1, further comprising a pump to pump the fluid present in the milk line system in the proposed discharge direction.

12. The milking system as claimed in claim 1, further comprising an intermediate milk storage vessel arranged in the milk line, which intermediate milk storage vessel is connected between the at least one milking device and the milk storage vessel, and configured to temporarily store milk from each of the connected milking devices and to subsequently transfer the milk to the milk storage vessel.

13. The milking system as claimed in claim 1, wherein the substantially vertical line portion is no more than 15 degrees from vertical.

14. A milking system comprising:
at least one milking device;
a milk storage vessel storing milk obtained with the milking device;
a milk line system including a milk line with a first end connected to the milking device and with a second end connected to the milk storage vessel; and
a monitoring system which comprises:
  a sensor configured to measure a fluid parameter value of a fluid in the milk line to determine a transition between milk and a cleaning fluid, and
  a control system operatively connected to the sensor and configured to process the measured fluid parameter value and to generate a transition signal on fulfilment of a predefined transition criterion;
wherein the milk line comprises a substantially vertical line portion, and a discharge direction of milk through the milk line from the milking device to the milk storage vessel is upwards through the substantially vertical line portion, and
wherein the sensor is placed in or on the substantially vertical line portion to allow air bubbles to pass at high speed past the sensor to avoid disrupting a measurement of the fluid parameter.

15. The milking system as claimed in claim 14, wherein the substantially vertical line portion is no more than 15 degrees from vertical.

16. A milking system comprising:
at least one milking device;
a milk storage vessel storing milk obtained with the milking device;
a milk line system including a milk line with a first end connected to the milking device and with a second end connected to the milk storage vessel; and
a monitoring system which comprises:
  a sensor configured to measure a fluid parameter value of a fluid in the milk line to determine a transition between milk and a cleaning fluid, and
  a control system operatively connected to the sensor and configured to process the measured fluid parameter value and to generate a transition signal on fulfilment of a predefined transition criterion;
wherein the milk line comprises a substantially vertical line portion, and a discharge direction of milk through the milk line from the milking device to the milk storage vessel is upwards through the substantially vertical line portion, and
wherein the sensor is placed in or on the substantially vertical line portion.

17. The milking system as claimed in claim 16, wherein the substantially vertical line portion is no more than 15 degrees from vertical.

* * * * *